United States Patent
Farmer et al.

(10) Patent No.: US 6,663,919 B2
(45) Date of Patent: Dec. 16, 2003

(54) PROCESS OF REMOVING A COATING DEPOSIT FROM A THROUGH-HOLE IN A COMPONENT AND COMPONENT PROCESSED THEREBY

(75) Inventors: Gilbert Farmer, Cincinnati, OH (US); Jeffrey Arnold Fehrenbach, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 70 days.

(21) Appl. No.: 10/086,266

(22) Filed: Mar. 1, 2002

(65) Prior Publication Data

US 2003/0165621 A1 Sep. 4, 2003

(51) Int. Cl.$^7$ .............................. C23C 4/18; B24C 1/00
(52) U.S. Cl. ....................... 427/453; 427/446; 427/140; 427/142; 427/331; 29/889.1; 29/889.72; 451/40
(58) Field of Search ................................ 427/446, 453, 427/140, 142, 331; 29/889.1, 889.72; 451/40

(56) References Cited

U.S. PATENT DOCUMENTS 6,004,620 A * 12/1999 Camm ........................ 427/142
6,329,015 B1 * 12/2001 Fehrenbach et al. ......... 427/142
6,368,060 B1 *  4/2002 Fehrenbach et al. ....... 416/97 R
2001/0001680 A1 *  5/2001 Farmer et al. ............... 427/348

* cited by examiner

Primary Examiner—Katherine A. Bareford
(74) Attorney, Agent, or Firm—David L. Narciso; Gary M. Hartman; Domenica N. S. Hartman

(57) ABSTRACT

A process of removing deposits from through-holes in a component, such as metallic bond coat and ceramic materials from cooling holes in an air-cooled gas turbine engine. The process is particularly effective in removing a TBC material deposited in a cooling hole of a component as a result of depositing a coating of the TBC material on a surface of the component, in which the deposit is removed from the cooling hole without damaging the cooling hole or the TBC coating surrounding the cooling hole on the coated surface of the component. A preferred feature is that the cooling hole, including the entrance to the hole at a surface of the component opposite the coated surface and the coating surrounding the exit of the hole at the coated surface, exhibits improved surface characteristics that increase the discharge coefficient of the cooling hole, as evidenced by an increase in the effective area of the cooling hole.

25 Claims, 8 Drawing Sheets

PROCESS OF REMOVING A COATING DEPOSIT FROM A THROUGH-HOLE IN A COMPONENT AND COMPONENT PROCESSED THEREBY

CROSS REFERENCE TO RELATED APPLICATIONS

Not applicable.

STATEMENT REGARDING FEDERALLY SPONSORED RESEARCH

Not applicable.

BACKGROUND OF THE INVENTION (1) Field of the Invention

The present invention generally relates to coatings deposited on components with through-holes that are desired to remain open after the coating process. More particularly, this invention is directed to a method for removing coating deposits from through-holes in a component surface without damaging the hole walls and component surface, and to a gas turbine engine component equipped with cooling holes whose cooling effectiveness is promoted as a result of the removal process.

(2) Description of the Related Art

Components located in certain sections of gas turbine engines, such as the turbine, combustor and augmentor, are often thermally insulated with a ceramic layer in order to reduce their service temperatures, which allows the engine to operate more efficiently at higher temperatures. These coatings, often referred to as thermal barrier coatings (TBC), must have low thermal conductivity, strongly adhere to the article, and remain adherent throughout many heating and cooling cycles. Coating systems capable of satisfying these requirements typically include a metallic bond coat that adheres the thermal-insulating ceramic layer to the component, forming what may be termed a TBC system. Metal oxides, such as zirconia ($ZrO_2$) partially or fully stabilized by yttria ($Y_2O_3$), magnesia (MgO) or other oxides, have been widely employed as the material for the thermal-insulating ceramic layer. The ceramic layer is typically deposited by air plasma spraying (APS), low pressure plasma spraying (LPPS), or a physical vapor deposition (PVD) technique, such as electron beam physical vapor deposition (EBPVD). Bond coats are typically formed of an oxidation-resistant diffusion coating such as a diffusion aluminide or platinum aluminide, or an oxidation-resistant alloy such as MCrAlY (where M is iron, cobalt and/or nickel).

While TBC systems provide significant thermal protection to the underlying component substrate, internal cooling of components such as combustor liners and turbine blades (buckets) and nozzles (vanes) is often necessary, and may be employed in combination with or in lieu of a TBC. Air-cooled components of a gas turbine engine typically require that the cooling air flow is discharged through carefully configured cooling holes that distribute a cooling film over the component surface to increase the effectiveness of the cooling flow. The efficiency of a cooling hole can be quantified by the discharge coefficient, $C_d$, which is the ratio of the effective area of a cooling hole based on flow measurements to the physical area of the hole. The effective area is less than the physical area as a result of surface conditions within the hole, including the entrance and exit of the hole, which provide resistance to air flow through the hole. Consequently, processes by which cooling holes are formed and configured are critical because the size, shape and surface conditions of each opening determine the amount of air flow exiting the opening and affect the overall flow distribution within the cooling circuit containing the hole.

For components that do not require a TBC, cooling holes are typically formed by such conventional drilling techniques as electrical-discharge machining (EDM) and laser machining, or with complex advanced casting practices that yield castings with dimensionally correct openings. Typical discharge coefficients for EDM and laser-drilled cooling holes in air-cooled combustor liners are on the order of about 0.72 and about 0.88, respectively, or less. EDM cannot be used to form cooling holes in a component having a TBC since the ceramic is electrically nonconducting, and laser machining is prone to spalling the brittle ceramic TBC by cracking the interface between the component substrate and the ceramic. Accordingly, cooling holes are often machined by EDM and laser drilling after deposition of the bond coat but prior to application of the TBC. However, the presence of TBC deposits in the cooling holes of an air-cooled component can detrimentally affect the service life of the component as a result of the TBC altering the shape and reducing the size of the cooling hole openings. For TBC's deposited by plasma spraying (APS and LPPS), a significant amount of ceramic can be deposited in the cooling holes when depositing a sufficiently thick TBC to thermally insulate such hot section components as combustor liners. The obstruction of cooling holes with TBC not only occurs with new manufactured air-cooled components, but also occurs when refurbishing a TBC on a component returned from the field. During refurbishing, all of the existing bond coat and TBC are typically removed, and new bond coat and TBC are deposited, with the result that cooling holes can be obstructed by deposits of both the bond coat and TBC materials.

From the above, it can be seen that manufacturing and refurbishing an air-cooled component protected by a TBC is complicated by the requirement that the cooling holes remain appropriately sized and shaped. Typical solutions are to limit the thickness of the TBC applied or, more preferably, perform a final operation to remove ceramic from the cooling holes in order to reestablish the desired size and shape of the openings. Various techniques have been proposed for this purpose. Japanese Laid-Open Patent No. Heisei 9-158702 discloses a process by which a fluid at pressures of 500 kgf/$cm^2$ (about 490 bar) or more is introduced into the interior of an air-cooled component, such that the fluid flows out through the cooling hole openings and, in doing so, removes ceramic material that had blocked the cooling holes as a result of the component being coated with the ceramic material after the cooling hole was formed. Another technique is disclosed in U.S. Pat. No. 6,004,620 to Camm, in which ceramic accumulated in a cooling hole is removed with a jet projected toward the uncoated surface of the hole. Camm uses a jet consisting essential of a liquid, such as water, at very high pressures. Camm teaches that the coating outside of the hole on the coated surface is undamaged because the component itself serves as a mask to prevent the jet from eroding the coating.

While it is known to modify a waterjet to contain an abrasive media (i.e., essentially nonspherical particles with sharp corners and edges), practice has shown that the erosion and abrasion caused by abrasive particles in a water jet at pressures adequate to remove a ceramic deposit can severely damage the cooling hole and the surrounding component surface. In addition, abrasive materials in an abrasive fluid jet fracture to the point where the abrasive media cannot be reused or is difficult to separate from the material removed by the jet. As a result, the spent abrasive fluid must be disposed of, which adds unwanted cost to the process.

BRIEF SUMMARY OF THE INVENTION

According to the present invention, there is provided a process of removing deposits from a through-hole in a component, an example being portions of a metallic and/or ceramic coating material deposited on a surface of an air-cooled gas turbine engine component. The process is particularly effective in removing a TBC material deposited in a cooling hole of a component as a result of coating a surface of the component with the TBC material, in which the deposit is removed from the cooling hole without damaging the cooling hole or the TBC surrounding the cooling hole on the coated surface of the component. A preferred feature is that the cooling hole, including the entrance to the hole and the TBC material surrounding the exit of the hole, exhibits improved surface characteristics that increase the discharge coefficient of the cooling hole, as evidenced by an increase in the effective area of the cooling hole.

According to a preferred aspect of the invention, the coating is deposited on the component surface such that deposits do not fully close the through-holes, thereby providing witness holes. The processing steps generally include directing a liquid-containing jet at a through-hole from the surface of the component opposite the coated surface. The jet contains non-abrasive particulate media, which as defined herein distinguishes the media particles from abrasive media used in abrasive cutting processes and whose particles have sharp corners and edges. The jet is preferably emitted from a nozzle at a pressure generally insufficient to effectively remove substantially all of the deposit from the hole if the particulate media were not present in the jet. As a result, removal of the deposit is primarily by the particulate media propelled by the jet and not the jet itself. A notable feature of the invention is the ability to produce a component whose surfaces surrounding the hole and within the hole are deburred and smoothed, such that the discharge coefficient of the hole is increased. In particular, the surface conditions of these surfaces have the appearance of being impacted, which visibly differs from surfaces produced by EDM and laser machining. The surfaces of holes treated in accordance with this invention also differ from that which exists when deposits are removed with a water jet alone, because water jets do not appreciably modify the surface of the hole. The surface condition and appearance of these surfaces also differ from that which exists if a deposit is removed with a water jet containing an abrasive material, since abrasives generally tend to cut and/or gouge the surfaces of the hole and the surrounding component surface.

In view of the above, the non-abrasive jet used in the process of this invention is able to remove deposits from a through-hole without damaging or removing any significant amount of material from the surface of the component surrounding the entrance to the hole and the walls of the hole, and without chipping a metallic or ceramic coating surrounding the exit of the hole. Surprisingly, when compared to cooling holes formed in air-cooled components by EDM and laser machining, cooling holes processed in accordance with this invention have been determined to exhibit higher discharge coefficients, evidenced by higher effective areas as compared to the physical cross-sectional area of the holes. As a result, cooling holes processed in accordance with this invention are more efficient in terms of their cooling capability.

Other objects and advantages of this invention will be better appreciated from the following detailed description.

DETAILED DESCRIPTION OF THE INVENTION

Figure 1:
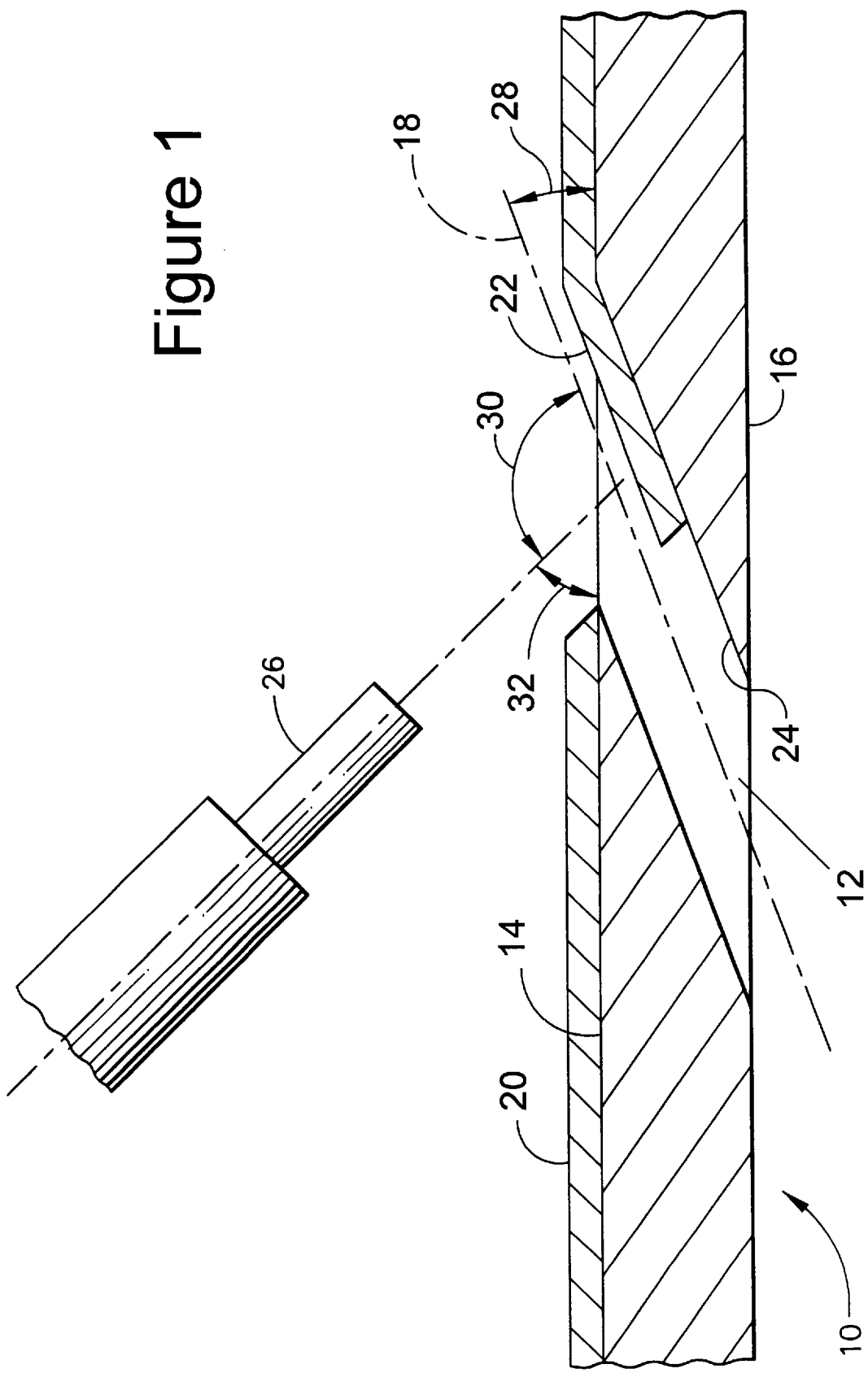
FIG. 1 represents a sectional view through a cooling hole of a combustor liner, showing the deposition of a coating on a surface of the liner and a deposit within the cooling hole as a result of the coating deposition.
Figure 2:
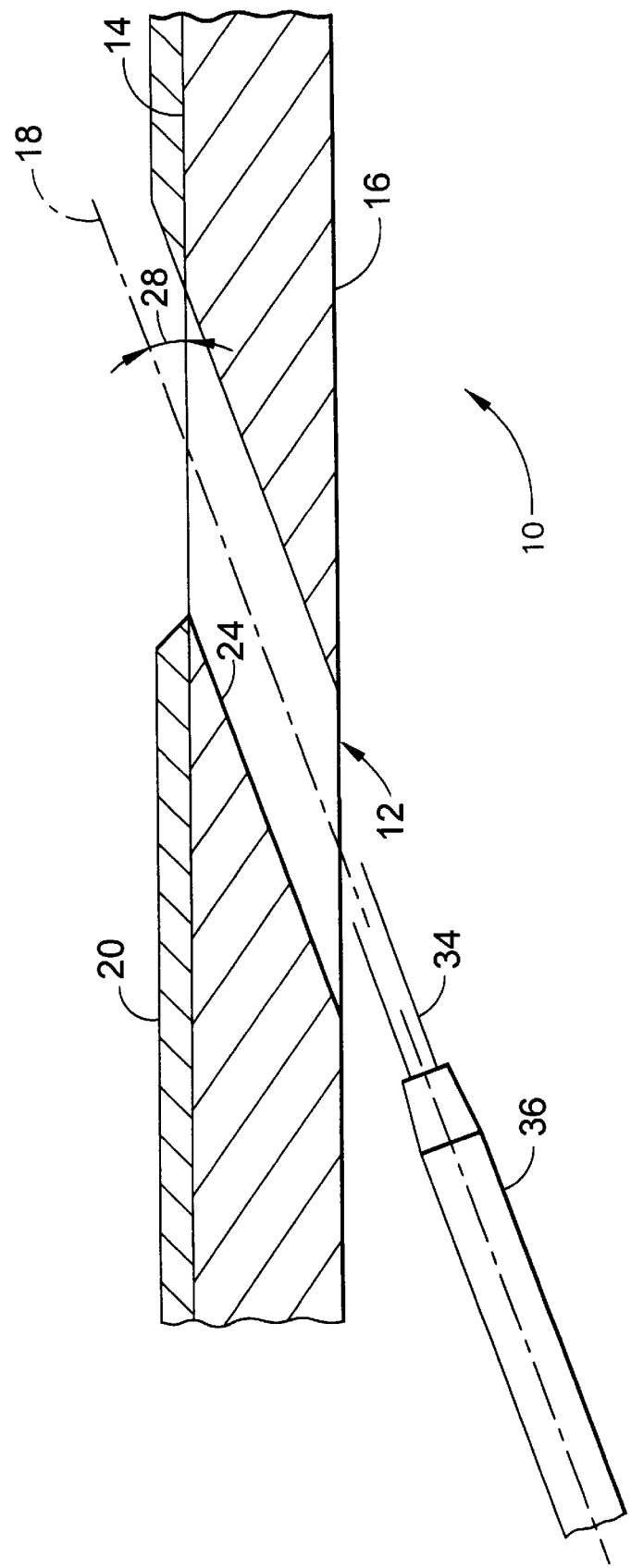
FIG. 2 represents a cross-sectional view of the cooling hole following removal of the deposit from the cooling hole in accordance with this invention.

FIGS. 1 and 2 represent cross-sectional views through a cooling hole 12 that intersects two opposing surfaces 14 and 16 of an air-cooled combustor liner 10 of a gas turbine engine. The liner 10 may be formed of an iron, nickel or cobalt-base superalloy, though other high temperature materials could foreseeably be used. As known in the art, to minimize the service temperature of the liner 10, heat is transferred from the liner 10 by forcing bleed air through the cooling hole 12 from a passage defined in part by the surface 16. In addition, the amount of heat transferred to the surface 14 of the liner 10 can be reduced by forming the cooling hole 12 to be disposed at an acute angle 28 relative to the surface 14 of the liner 10, so that air discharged from the cooling hole 12 flows over the surface 14 of the liner 12. Suitable techniques for forming the hole 12 include EDM or laser drilling, though it is foreseeable that the hole 12 could be formed by such other methods as casting or abrasive water jet machining. As a result of the forming operation, the hole cooling 12 is shown as having a linear axis 18 and a substantially uniform circular cross-section. To promote heat transfer from the liner 10, the cooling hole 12 is carefully configured to maximize its efficiency, quantified by its discharge coefficient which is dependent on the geometry of the hole 12 and any surface irregularities within the hole 12.

The liner 10 is shown in FIG. 1 as having a coating 20 deposited on the surface 14 of the liner 10. The coating 20 may be a metallic material, a ceramic material, or both in the form of a TBC system comprising a metallic bond coat and a ceramic TBC. Particularly suitable bond coat materials include diffusion aluminide and/or MCrAlY overlay coatings, while a suitable TBC material is zirconia partially stabilized with yttria (yttria-stabilized zirconia, or YSZ), though zirconia fully stabilized with yttria could be used, as well as zirconia stabilized by other oxides, such as magnesia (MgO), calcia (CaO), ceria ($CeO_2$) or scandia ($Sc_2O_3$). The cooling hole 12 is shown as having a deposit 22 adhered to its wall 24 as a result of the process by which the coating 20 was deposited. FIG. 1 represents the coating 20 as being deposited by plasma spraying, such as air plasma spraying (APS) and low pressure plasma spraying (LPPS), though other deposition processes could be used. To apply the coating 20, the liner 10 can be positioned on a conventional turntable (not shown), and a suitable spray apparatus located adjacent the turntable to apply the coating material as the liner 10 is rotated.

FIG. 1 shows a nozzle 26 of a spray head through which the coating material is applied. The spray nozzle 26 is shown as being disposed at an angle 30 relative to the axis 18 of the hole 12, and deposits the coating 20 to a thickness selected in combination with the spray angle 30 to prevent the coating 20 from entirely filling the hole 12. A preferred spray angle 30 is greater than ninety degrees relative to the axis 18 in order to minimize the size of the deposit 22, i.e., the amount of coating material deposited on the wall 24 of the hole 12 opposite the spray nozzle 26. In addition, the coating material is preferably sprayed onto the surface 14 of the liner 10 at an angle of incidence 32 of at least about forty-five degrees relative to the surface 14, because angles of incidence 32 less than about forty-five degrees tend to cause the coating 20 to have unmelted areas, voids and lower tensile strength. In view of these considerations, when depositing a coating 20 on a liner 10 with cooling holes 20 disposed at an angle 28 of about twenty degrees and having diameters of about 0.020 to 0.030 inch (about 0.50 to about 0.75 mm), a suitable orientation for the spray nozzle 26 is an angle of incidence 32 of about forty-five degrees to the surface 14 of the liner 10, and an angle 28 relative the axes 18 of the holes 12 of about 135 degrees. To ensure that a metallic coating (e.g., bond coat) 20 does not entirely block the hole 12, the thickness of the coating 20 is preferably about 0.004 inches to about 0.010 inches (about 0.10 to about 0.25 mm), more preferably about 0.004 inch to about 0.008 inch (about 0.10 to about 0.20 mm). When a ceramic coating (e.g., TBC) 20 is deposited, the thickness of the coating 20 is preferably about 0.003 inches to about 0.020 inches (about 0.075 to about 0.50 mm), more preferably about 0.010 inch (about 0.25 mm) to ensure the coating 20 does not entirely block the hole 12. In each case, the unfilled portion of the hole 12 provides a witness hole, as evident from FIG. 1.

If the liner 10 is newly manufactured and the coating 20 is a metallic bond coat, the deposit 22 can be removed by EDM or laser drilling. However, if the coating 20 is a TBC or the liner 10 has been returned from the field, the coating 20 is removed with a non-abrasive jet 34 represented in FIG. 2 as being emitted from a nozzle 36 approximately coaxially aligned with the axis 18 of the cooling hole 12. According to a preferred aspect this invention, a non-abrasive jet 34 is able to remove the deposit 22 from the cooling hole wall 24 without damaging the liner 10, the wall 24, or the coating 20, and in addition has the capability of promoting the efficiency of the cooling hole 12. The jet 34 employed by the invention is termed non-abrasive because it contains a non-abrasive media in a carrier fluid. While various fluids could be used, water is preferred as being environmentally safe and because it will not chemically affect the coating material or the liner 10. A suitable process employs water pressurized to as much as about 16,000 psi (about 1100 bar), preferably at least 6000 psi (about 400 bar) up to about 15,000 psi (about 1000 bar). The jet 34 preferably contains about 10 to about 30 weight percent of the non-abrasive media, with a media content of about 20 weight percent providing excellent results. As a non-abrasive media, particles entrained in the jet 34 lack the sharp corners and edges found on abrasive materials, and instead preferably have a spherical shape, as in the case of spherical glass beads of the type used for peening. An example of a suitable non-abrasive media is beads formed of soda-lime glass or metal oxides and having a mesh (U.S. sieve) size of 325 to 170 (diameters of about 45 to about 90 micrometers) per Military Specification G-9954A Mil 13. Another suitable non-abrasive media is believed to be stainless steel shot, generally in the same range of particle sizes. Larger particle sizes generally necessitate a lower media content in the jet, while smaller particle sizes generally necessitate a higher media content, both of which appear to limit the effectiveness of the jet. At least about 70 percent of the media, and more preferably at least 95 percent of the media has a spherical shape to avoid undue damage or abrasion of the cooling hole 12.

In the process of removing either a metallic or ceramic coating 20, the liner 14 can be placed on a turntable (not shown) and the turntable rotated as the nozzle 36, connected to a suitable water jet apparatus, delivers the non-abrasive jet 34 through the witness hole remaining after deposition of the coating 20. As shown in FIG. 2, the jet 34 is sprayed at the entrance of the hole 12 located at the surface 16 of the liner 10 opposite the coating 20. A suitable standoff distance (the distance between the nozzle 36 and the surface 16 of the liner 10) is about 0.8 to 2 inches (about 20 to 50 mm), though greater and lesser distances are foreseeable. At these distances, the jet 34 preferably has a diameter of about 0.050 to about 0.150 inch (about 1.3 to about 3.8 mm). Unlike the coatings 20, which is preferably applied at an angle 32 relative to the surface 14, the jet 34 is preferably aimed in a direction generally parallel to the axis 18 of each hole 12 in the liner 10 in order to facilitate removal of the deposit 22. It has been found that the removal of the deposit 22 can be further facilitated by depositing the coating 20 to a thickness that provides a witness hole whose diameter is about 0.006 to about 0.010 inch (about 0.15 to about 0.25 mm). Because of the preference to limit the amount of coating 20 deposited at any given time to ensure a witness hole remains at the surface 14 of the liner 10, multiple deposition steps may be performed to build up a coating 20 to have the desired thickness, with each deposition step followed by removal of the accumulated deposit 22 using the non-abrasive jet 34.

A non-abrasive water jet 34 as described above has been found to remove both metal and ceramic deposits 22 in a cooling hole 12 without damaging the cooling hole wall 24 and without chipping the coating 20 surrounding the hole 12. While not wishing to be held to any particular theory, this aspect of the invention is believed to be attributable to the deposit 22 being removed primarily by fracturing caused by impacts with the particles, instead of erosion caused by a jet of water at very high pressures or abrasion caused by an abrasive-containing jet. As such, the jet 34 employed with this invention can be sprayed from the nozzle 36 at a pressure that would be insufficient to effectively remove substantially all of the deposit 22 from the cooling hole 12 if the particulate media were not present in the jet 34. As indicated above, such pressures are believed to be up to about 16,000 psi (about 1100 bar). Notably, and as will be discussed in further detail below, operating the non-abrasive jet 24 at pressures of about 16,000 psi and above can result in the undesirable removable of material from the wall 24 of the hole 12 and that portion of the surface 16 immediately surrounding the hole 12. Therefore, by limiting the jet 34 to pressures of less than 16,000 psi, preferably 15,000 psi (about 1000 bar) or less, the jet 34 need not be interrupted as it travels from one cooling hole 12 to another. A suitable traversal rate for the jet 34 is about 20 to about 480 inches per minute (about 50 to about 1200 cm/minute), with a rate of about 250 inches per minute (about 625 cm/minute) producing excellent results. Although movement of the jet 34 relative to the liner 10 is preferably continuous, it is foreseeable that the jet 34 could be allowed to dwell when aligned with each cooling hole 12.

In addition to removing the deposit 22 without damaging the wall 24 of the cooling hole 12 or chipping the coating 20 surrounding the exit of the hole 12, the jet process of this invention has been unexpectedly found to increase the discharge coefficient of the cooling hole 12, as evidenced by an increase in the effective area of the cooling hole 12 relative to the physical area of the hole 12. While not wishing to be held to any particular theory, this beneficial effect appears to be attributable to the non-abrasive media deburring and smoothing the surface 16 of the liner 10 immediately surrounding the entrance to the hole 12, the wall 44 of the hole 12, and even the wall of the coating 20 defined by removal of the deposit 22. This deburring and smoothing action effects the surface condition and appearance of these surfaces, which differ from that produced when the hole 12 is first formed by EDM or laser machining, and also differ from that which is produced if the deposit 22 had been removed with a water jet alone or with the assistance of an abrasive. This difference is represented in FIG. 3.

Figure 3:
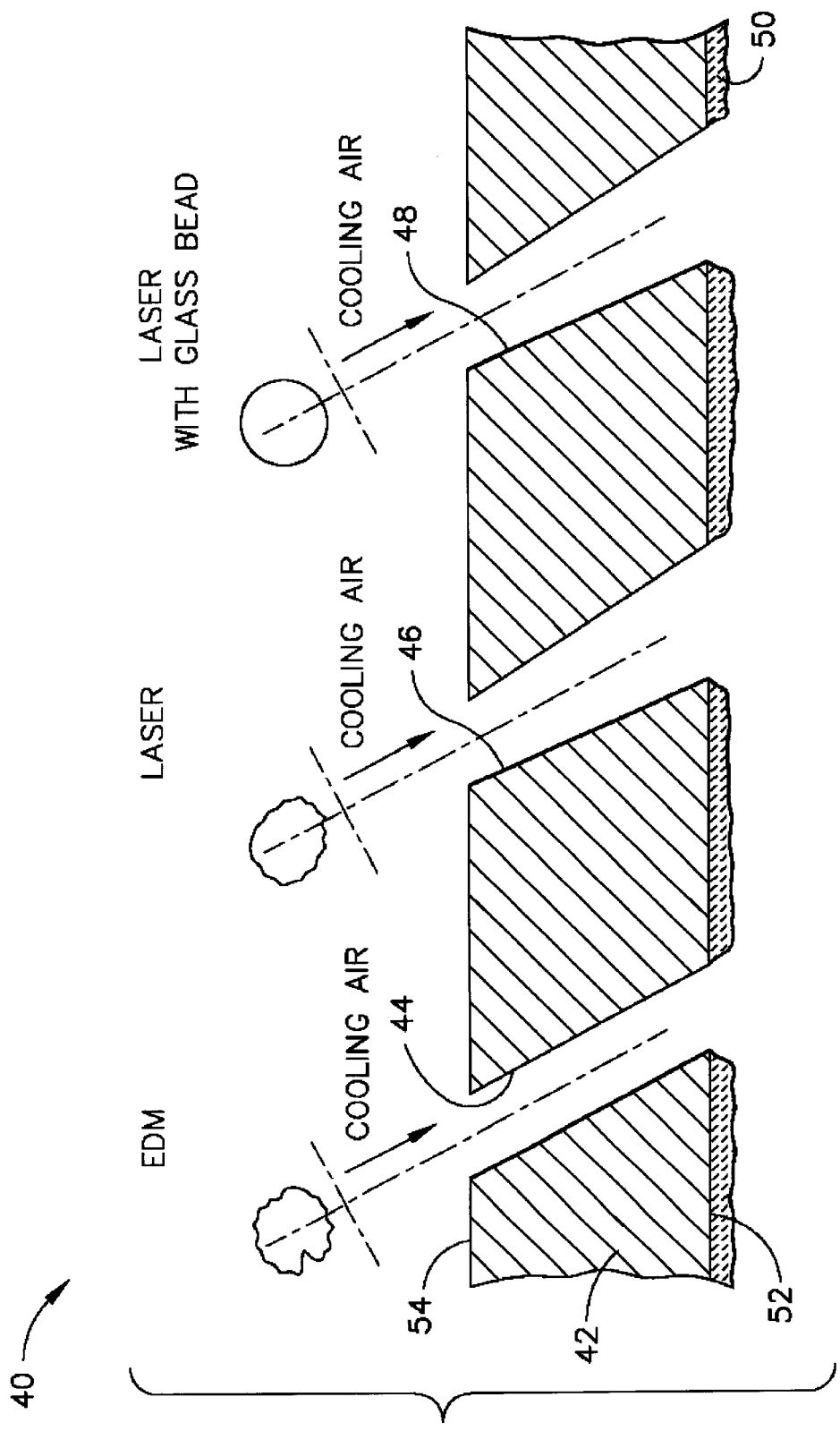
FIG. 3 represents three cooling holes, two of which were formed by EDM and laser drilling and are depicted in the as-machined condition, the third being formed by laser drilling and then treated with a water jet containing a non-abrasive media in accordance with this invention.

FIG. 3 represents three cooling holes 44, 46, 48 drilled through the wall 42 of a component 40 having a ceramic TBC 50 on its lower surface 52, and an upper surface 54 that is free of TBC and from which the machining operation was performed. The hole 44 is represented as having been drilled by EDM, and as a result has a substantially continuous circular shape throughout its extent through the wall 42. However, the entrance to the hole 44 at the uncoated surface 54 irregular (jagged) as a result of the presence of burs, etc. The hole 46 is represented as having been laser-drilled, characterized by the diameter of the hole 46 increasing through the wall 42. Similar to the EDM-drilled hole 44, the laser-drilled hole 46 has a circular but irregular entrance at the uncoated surface 54 as a result of the laser-drilling operation. Finally, the hole 48 is represented has being drilled by laser and then treated with a waterjet containing glass beads in accordance with this invention. As such, the hole 48 has the same conical shape as the laser-drilled hole 46, but its entrance at the uncoated surface 54 is very regular and smooth in appearance as a result of the waterjetting operation having removed burs and other surface features protruding into the hole 48. EDM and laser-drilled cooling holes in the as-machined condition depicted in FIG. 3 have typical discharge coefficients of about 0.71 to about 0.73 and about 0.87 to about 0.89, respectively. In contrast, laser-drilled holes treated with the non-abrasive waterjet process (as shown in FIG. 3) exhibit significantly higher discharge coefficients, on the order of about 0.91 to about 0.93, and potentially higher.

In an investigation leading to this invention, the relative aggressiveness of various jet compositions was evaluated with a number of panels formed of the nickel-base superalloy known as GTD-222, having a nominal composition, in weight percent, of about 22.5 chromium, about 19.0 cobalt, about 2.3 titanium, about 1.2 aluminum (about 3.5 titanium+ aluminum), about 2.0 tungsten, about 0.8 columbium, and about 1.0 tantalum, about 0.01 zirconium, about 0.01 boron, about 0.1 carbon, with the balance being nickel and incidental impurities. The panels had thicknesses of about 0.080 inch (about 2 mm), and coated with a 20 mil-thick (about 0.50 mm) layer of yttria-stabilized zirconia (YSZ) deposited by APS. The YSZ coatings were subjected to multiple passes of one of four waterjet treatments at a standoff distance of about 0.5 inch (about 13 mm). A first of the jets contained water only, a second waterjet contained about 20.75 weight percent of plastic beads having diameters of about 45 to about 90 micrometers, a third waterjet contained about 20.75 weight percent of baking soda, while a fourth waterjet contained about 20.75 weight percent of glass spherical beads having diameters of about 45 to about 90 micrometers. Each of the waterjets was produced at a pressure of about 5000 psi (about 345 bar) with a nozzle having a diameter of about 0.050 inch (about 1.3 mm). After each treatment cycle, consisting of a set of three passes with the waterjet at a traversal rate of about 250 inches/minute (about 635 mm/minute), erosion of the YSZ coatings and the underlying panel surface was measured. Table I summarizes the data from this investigation.

TABLE I

| (mils) | | Cumulative Material Loss Measured After Each Cycle | | | | |
|---|---|---|---|---|---|---|
| Panel | Media | Cycle 1 | Cycle 2 | Cycle 3 | Cycle 4 | Cycle 5 |
| A | None | 4 | 14 | 17 | 21 | 23 |
| B | Plastic Beads | 4 | 10 | 13 | 14 | 16 |
| C | Baking Soda | 4 | 7 | 10 | 13 | 16 |
| D | Glass Beads | 20 | 21 | 22 | 22 | 22 |

The above results indicated that, at a relative low pressure (5000 psi), a waterjet containing glass beads had an immediate effect as compared to a media-free waterjet and waterjets containing plastic beads and baking soda. After a single cycle (three passes), essentially the entire 20-mil thick TBC was removed by waterjetting with glass beads, after which minimal wear of the underlying substrate occurred. In contrast, coating loss with the other three treatments gradually occurred over five cycles (fifteen passes). This investigation suggested that a low-pressure waterjet treatment with glass beads is capable of quickly removing a ceramic coating without eroding or otherwise damaging the underlying metal substrate.

Notably, the investigation also indicated that a jet consisting essentially of water (or another liquid) would be relatively ineffective in removing ceramic deposits within a cooling hole unless very high pressures are employed, because ceramic within a cooling hole is anchored by compressive stresses that develop as the coated component cools from the high temperatures required to deposit ceramic.

In another investigation, the aggressiveness of glass beads toward a metal substrate was further evaluated. Panels similar to those of the previous investigation were subjected to multiple passes of a waterjet treatment performed using the same nozzle, standoff distance and traversal rate as used in the first investigation. As with the previous investigation, the waterjet contained about 20.75 weight percent of glass spherical beads having diameters of about 45 to about 90 micrometers. In this investigation, different panels were subjected to waterjets produced at different pressures, from about 5000 psi (about 345 bar) to about 40,000 psi (about 2760 bar). After each treatment cycle, consisting of a set of three passes with the waterjet, erosion of the panel surface was measured. Table II summarizes the data from this investigation.

TABLE II

| Panel | Pressure (psi) | Cumulative Coating Loss (mils) Measured After Each Cycle | | | | |
|---|---|---|---|---|---|---|
| | | Cycle 1 | Cycle 2 | Cycle 3 | Cycle 4 | Cycle 5 |
| E | 5000 | 0 | 0 | 0 | 0 | 0 |
| F | 10,000 | 0 | 0 | 0 | 0 | 0 |
| G | 12,000 | 0 | 0 | 0 | 0 | 0 |
| H | 14,000 | 0 | 0 | 0 | 0 | 0 |
| E | 16,000 | 0 | 0 | 0.1 | 0.4 | 0.5 |
| F | 18,000 | 0.1 | 0.3 | 0.6 | 0.9 | 0.9 |
| G | 20,000 | 0.1 | 0.3 | 0.6 | 0.9 | 0.9 |
| H | 40,000 | 3.2 | 7.4 | 10.9 | 13.5 | 15.1 |

From these results, it was concluded that a waterjet containing glass beads can cause a measurable level of erosion at pressures of about 16,000 (about 1110 bar), and would likely erode a metal substrate at pressures above 16,000 (about 1110 bar) as the waterjet is traversed between cooling holes. Furthermore, multiple waterjet treatments with glass beads over the life of a component could possibly erode an unacceptable amount of metal from a component surface between cooling holes. Accordingly, pressure levels of up to about 14,000 psi (about 970 bar) are believed to be particularly suitable; with a maximum pressure appearing to be not higher than 16,000 psi (about 1100 bar), such as up to about 15,000 psi (about 1000 bar).

In a third investigation, the aggressiveness of a non-abrasive waterjet toward a metal substrate was again evaluated using a procedure in which the waterjet was laterally incremented a distance of about 0.010 inch (about 0.25 mm) following each pass with the waterjet, for a total of fifteen passes, such that the waterjet overlapped the surface treated in the previous cycle. Panels similar to those of the previous investigations were subjected to three sets (forty-five passes total) of waterjet treatments in the above manner. The waterjet treatments were performed on the panels at different pressures, from about 10,000 psi (about 700 bar) to about 15,000 psi (about 1000 bar). The waterjet treatments of this investigation were performed with the same nozzle, standoff distance, traversal rate and non-abrasive media and media concentration as used in the previous investigations. At the completion of the treatments, erosion of the panel surfaces was measured. Table III summarizes the data from this investigation.

TABLE III

| Panel | Pressure (psi) | Cumulative Coating Loss (mils) |
|---|---|---|
| I | 10,000 | 0 |
| J | 11,000 | 0.05 |
| K | 12,000 | 0.1 |
| L | 13,000 | 0.15 |
| M | 14,000 | 0.2 |
| N | 15,000 | 0.3 |

These results were seen as evidencing that, when treated with a waterjet containing a non-abrasive media, a superalloy combustor liner equipped with cooling holes spaced about 0.010 inch apart would sustain an acceptable amount of metal erosion when treated at pressures of about 11,000 psi (about 760 bar) up to about 15,000 psi (about 1000 bar), and erosion could be essentially avoided if pressures of about 10,000 psi (about 700 bar) or less were used. As such, pressures of up to about 10,000 psi (about 700 bar) might be preferred if the component was required to survive numerous treatments. Otherwise, a maximum acceptable pressure level was concluded to be about 15,000 psi (about 700 bar) for components desired to survive a limited number of treatments, as is typically the case with combustor liners. However, it is believed that metal erosion can be reduced by employing higher traversal rates, i.e., higher than the 250 inches/minute (about 635 mm/minute) employed in this investigation.

In a fourth investigation, ninety-five through-holes were laser-drilled in each of eight panels similar to those of the previous investigations. The holes had diameters of about 0.015 to about 0.023 inch (about 0.38 to about 0.58 mm), and were oriented at an angle of about 20 degrees to the surface of the panels. The diameter through each hole was measured with gauge pins, and then the total effective area of the holes on each panel was determined using water at a pressure drop of about 20 inches of water (about 50 mbar). The panels were then coated by plasma spraying with an MCrAlY bond coat having a thickness of about 0.006 inch (about 0.15 mm) or about 0.008 inch (about 0.20 mm), with the result that some of the bond coat material was deposited within each hole, though a witness hole remained. The metallic deposits within these holes were then removed with a waterjet containing the same non-abrasive media and media concentration as used in the previous investigations, and with the same nozzle, standoff distance and traversal rate. The waterjet was produced at a pressure of about 10,000 psi (about 700 bar). Following the waterjetting operation, a ceramic coating of YSZ was deposited to a thickness of about 0.020 inch (about 0.50 mm) in two separate deposition steps, each resulting in about 0.010 inch (about 0.25 mm) ceramic being deposited, resulting in the holes being partially blocked but with witness holes still present. After each deposition step, the diameters of the holes were rechecked with gauge pins, the ceramic deposits were removed using a waterjet under the same conditions used to remove the bond coat material from the holes, and the diameters of the holes again re-gauged. After all steps were completed, the panels were again tested with a pressure drop of about 20 inches of water (about 50 mbar) to determine the total effective area of their holes.

Table IV summarizes the data collected during this investigation. The column under "Initial Flowcheck" is the effective area measured for the entire panel (all holes) immediately after machining the holes. The first column with the heading "Hole Gauge Diameters" tabulates the diameters of two holes on each panel measured with gauge pins before ("B") and after ("A") the waterjetting operation following application of the bond coats. The second and third columns under "Hole Gauge Diameters" tabulate the diameters of the same holes when measured with gauge pins before ("B") and after ("A") the waterjetting operations following application of the first and second layers of ceramic, respectively. Finally, the last column under "Final Flowcheck" is the effective area measured for the entire panel (all holes) following the final waterjetting operation performed after the second ceramic layer was deposited.

TABLE IV

| Panel | Initial Flowcheck (in²) | Bond Coat Thickness (mils) | Hole Gauge Diameters B/A (mils) | B/A (mils) | B/A (mils) | Final Flowcheck (in²) |
|---|---|---|---|---|---|---|
| O | 0.0265 | 4 | 17/17 | 11/15 | 11/11 | 0.0326 |
|   |        |   | 13/14 | 11/11 | 11/11 |        |
| P | 0.0447 | 4 | 19/19 | 13/19 | 12/13 | 0.0514 |
|   |        |   | 24/24 | 18/24 | 16/21 |        |
| Q | 0.0437 | 4 | 22/24 | 17/24 | 16/21 | 0.0472 |
|   |        |   | 22/22 | 15/22 | 14/19 |        |
| R | 0.0410 | 4 | 17/17 | 11/18 | 12/13 | 0.0426 |
|   |        |   | 21/21 | 13/21 | 12/18 |        |
| S | 0.0379 | 8 | 14/15 | 11/14 | 11/11 | 0.0396 |
|   |        |   | 14/15 | 11/15 | 11/11 |        |
| T | 0.0311 | 8 | 13/14 | 11/14 | 11/11 | 0.0334 |
|   |        |   | 13/15 | 11/15 | 11/14 |        |
| U | 0.0323 | 8 | 18/19 | 12/19 | 11/15 | 0.0355 |
|   |        |   | 12/13 | 11/13 | 11/11 |        |
| V | 0.0292 | 8 | 12/14 | 11/12 | 11/11 | 0.0307 |
|   |        |   | 13/13 | 11/13 | 11/11 |        |

From Table IV, it can be seen that the diameters of the holes as detected with the gauge pins generally decreased with each process step. This trend was the result of using gauge pins to check the diameters of the holes, which were no longer straight through the full widths of the panels as a result of coating buildup. Nonetheless, the effective flow areas of the holes had actually increased by an average of about 9.3 percent at the completion of the deposition and waterjetting processes, evidencing that their discharge coefficients had also increased significantly (based on the discharge coefficient being defined as the ratio of the effective area to the physical area of the hole). These results indicated that, in addition to eliminating deposits, the non-abrasive waterjet had significantly improved the surface conditions at the entrances to the holes and within the holes, even though the holes themselves were no longer uniformly straight throughout their lengths.

To evaluate whether an increase in discharge coefficient could be achieved with the use of a media-free waterjet, a fifth investigation was undertaken with eleven panels essentially identical to those of the fourth investigation. After laser drilling the through-holes, the total effective area of the holes on each panel was determined using water at a pressure drop of about 20 inches of water (about 50 mbar). The panels were then cleaned by air and water-assisted grit blasting, tested for total effective area of the holes, and coated with an MCrAlY bond coat and a YSZ TBC in the same manner described for the fourth investigation, except that all of the bond coats were deposited to thicknesses of about 0.006 inch (about 0.15 mm). After each coating cycle, ten of the panels (Panels 300–309) were treated with a media-free waterjet at pressures ranging from about 11,000 to about 40,000 (about 760 to about 2760 bar) in an attempt to remove deposits from their holes, while the eleventh panel (Panel 316) was treated with a waterjet at a pressure of about 10,000 psi (about 700 bar) and containing the same non-abrasive media and media concentration as used in the previous investigations. The same nozzle and traversal rate as used in the previous investigations was used here, while the standoff distance was about 2.0 inches (about 5 mm). After all three deposition and waterjetting cycles were completed, the panels were again tested to determine the total effective area of their holes.

The results of this investigation are summarized in Table V below. The column under "Initial Flowcheck" is the total effective area measured immediately after laser drilling the holes, and the column under "Pre-Coat Flowcheck" is the total effective area measured after grit blasting the panels. The column under "Final Flowcheck" is the total effective area measured following the final waterjetting operation. The "Change" column indicates the change in total effective flow area between the "Pre-Coat" and "Final" flowchecks.

TABLE V

| Panel | Initial Flowcheck (in²) | Pre-Coat Flowcheck (in²) | Waterjet Pressure (psi) | Final Flowcheck (in²) | Change (%) |
|---|---|---|---|---|---|
| 300 | 0.0354 | 0.0387 | 11,000 | 0.0254 | −34 |
| 301 | 0.0349 | 0.0358 | 12,000 | 0.0224 | −37 |
| 302 | 0.0328 | 0.0357 | 13,000 | 0.0257 | −28 |
| 303 | 0.0372 | 0.0380 | 14,000 | 0.0294 | −23 |
| 304 | 0.0375 | 0.0404 | 15,000 | 0.0310 | −23 |
| 305 | 0.0332 | 0.0340 | 20,000 | 0.0269 | −21 |
| 306 | 0.0309 | 0.0330 | 25,000 | 0.0278 | −16 |
| 307 | 0.0343 | 0.0352 | 30,000 | 0.0290 | −18 |
| 308 | 0.0339 | 0.0349 | 35,000 | 0.0291 | −17 |
| 309 | 0.0326 | 0.0342 | 40,000 | 0.0299 | −13 |
| 316 | N/A | 0.0301 | 10,000 | 0.0325 | +8 |

The above data show that the effective flow areas of the holes in the panel subjected to the non-abrasive waterjet of this invention increased by about 8 percent, even though the pressure used was only 10,000 psi (about 700 bar). Accordingly, this result of the investigation was in agreement with the results of the fourth investigation. In contrast, the media-free waterjets did not improve the effective area, and therefore the discharge coefficient, of the original laser-drilled holes at pressures of up to 40,000 psi (about 2760 bar). Accordingly, it was concluded that a media-free jet does not appreciably modify the surface at the entrance and within a cooling hole, with the result that cooling holes processed with a jet consisting essentially of liquid are believed to have essentially the same discharge coefficients as that of an EDM and laser-drilled hole. Notably, this investigation also appeared to confirm the conclusion from the first investigation that a jet consisting essentially of water (or another liquid) would be relatively ineffective in removing ceramic deposits within a cooling hole unless very high pressures are employed. However, at such pressures the coating surrounding the holes tended to chip, such that the exits to the holes were not smooth.

Figure 4:
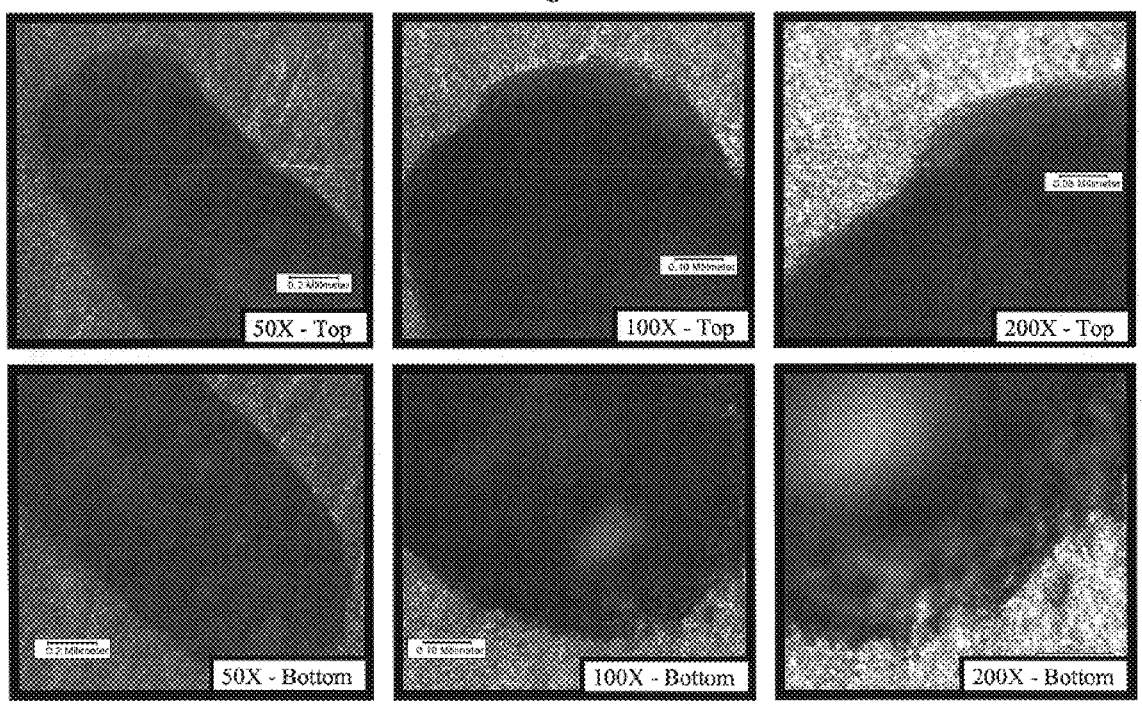
FIGS. 4, 5, 6 and 7 are scanned images showing, respectively, the appearance of laser-drilled through-holes in the as-machined condition, after machining and grit blasting, after coating and then processing with a jet containing only water, and after coating and then processing with a jet containing a non-abrasive media in accordance with this invention.
Figure 5:
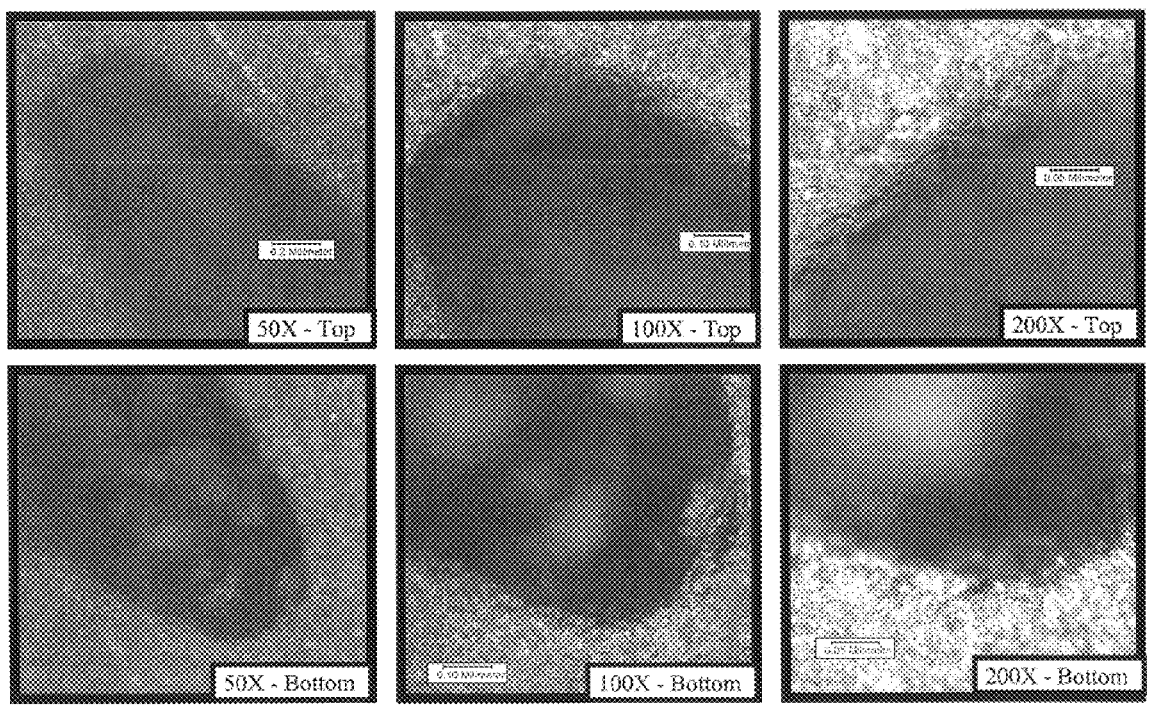
Figure 6:
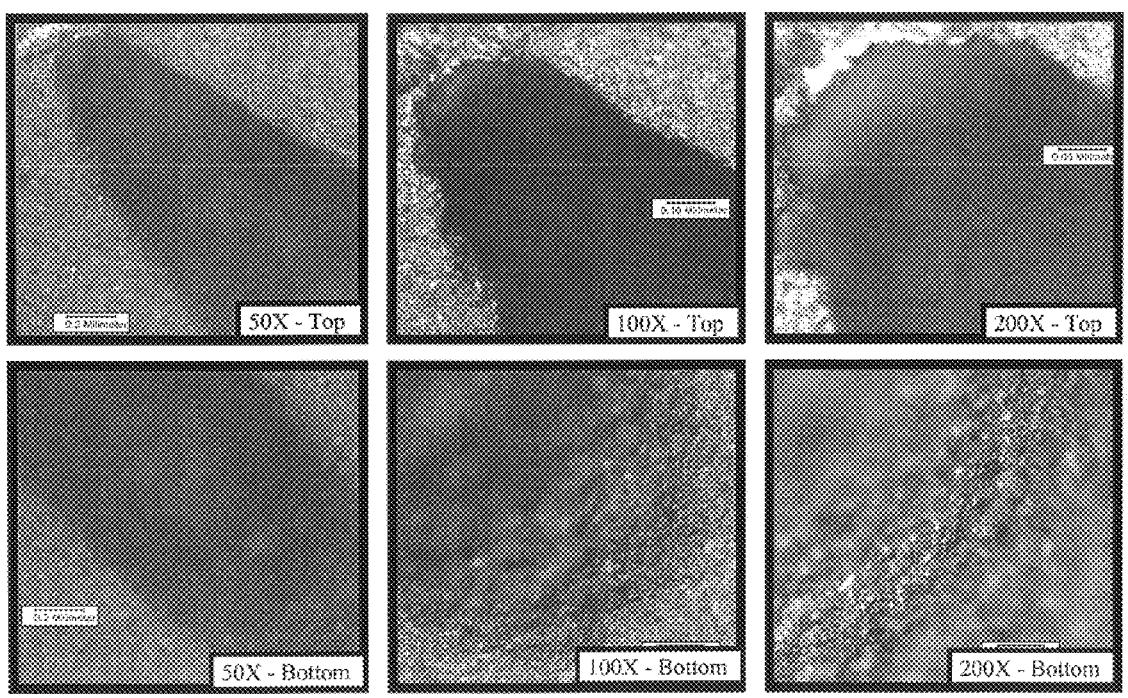
Figure 7:
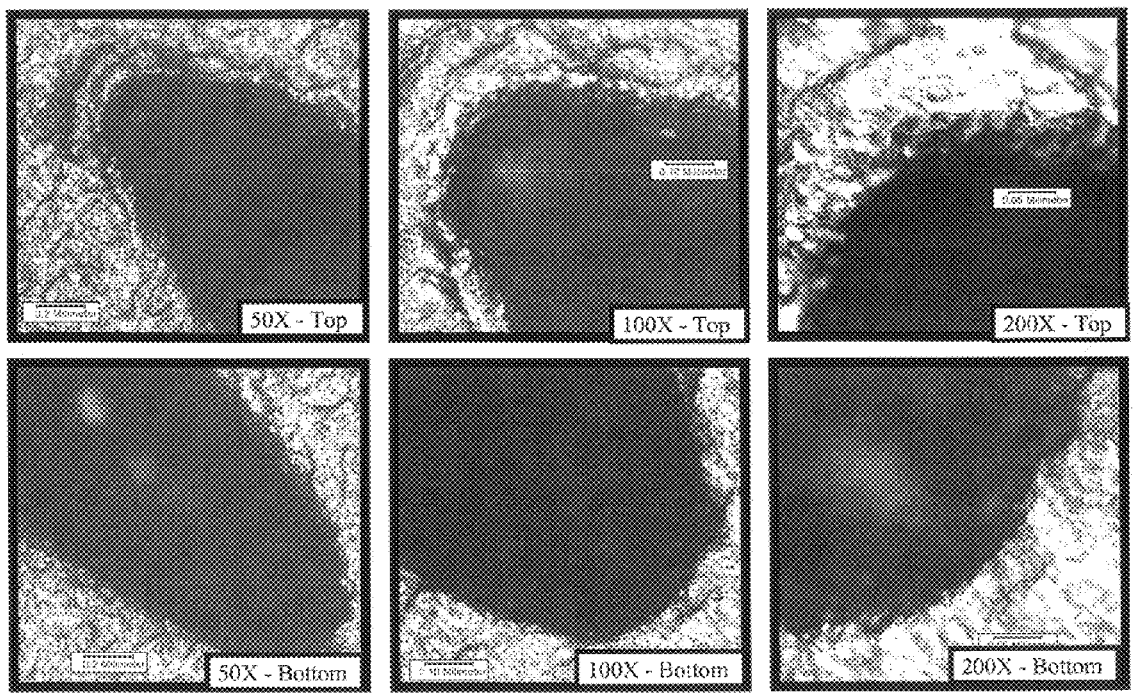

FIGS. 4, 5, 6 and 7 are scanned images of four panels in which through-holes were laser drilled at an angle of about twenty degrees to the surfaces of the panels. FIG. 4 shows the appearance of a hole in the as-machined condition, while FIG. 5 shows the appearance of a hole after air-water assisted grit blasting. FIG. 6 shows Panel 309 from the fifth investigation above, which was processed with a media-free waterjet at a pressure of 40,000 psi (about 2760 bar) after each bond coat and TBC deposition cycle. Finally, FIG. 7 shows Panel 316 of the fifth investigation, which had undergone processing with the non-abrasive waterjet of this invention after each bond coat and TBC deposition cycle. Each of FIGS. 4 through 7 show three sets of two images, with each set being at a magnification of 50×, 100× or 200×, as indicated. The two images of each set are designated as either "top" and "bottom," meaning that the photographs are of the upper lefthand or lower righthand corners, respectively, of the hole entrances (located on the uncoated surfaces of the specimens in FIGS. 6 and 7).

In FIG. 4, recast and other debris from the laser drilling operation are visible along the edge defined by the entrance of the hole in the as-machined condition. All of the specimens exhibited similar recast and debris immediately after laser drilling. FIG. 5 shows that air and water-assisted grit blasting at pressures of about 60 to 80 psi (about 4 to about 5.5 bar) was able to remove some of the recast and debris, but the irregular surface of the hole is still evident. As seen from FIG. 6, the media-free waterjet treatment performed on Panel 309 (water pressure of about 40,000 psi (about 2760 bar)) was successful in reopening the hole after bond coat and TBC deposition, though the TBC coating surrounding the exit of the hole was noticeably chipped. Debris from the bond coat can be clearly seen on the walls of the hole, evidencing that the waterjet treatment was ineffective in reestablishing the original size of the hole. Furthermore, the appearance of the surface surrounding and within the hole has not changed, indicating that the waterjet did not alter the as-machined surface finish of the hole. These observations agree with the data in Table V that showed the media-free waterjet treatment did not increase the effective area (and, therefore, the discharge coefficients) of the holes in Panel 309, and instead the effective area was reduced from that of the original laser-drilled hole as a result of the presence of the bond coat debris.

Figure 8:
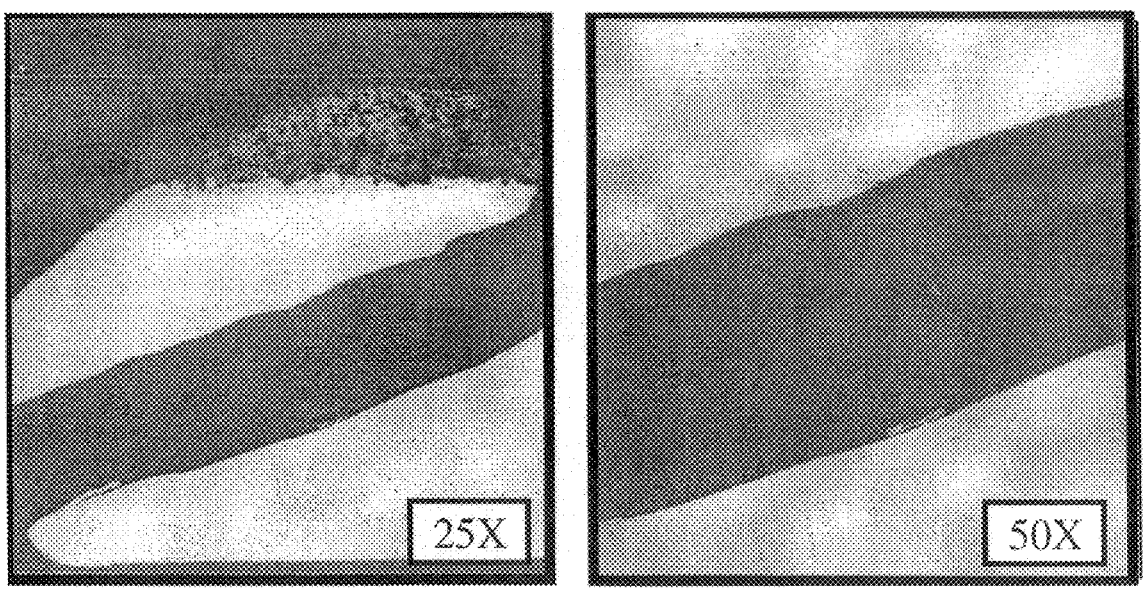
FIG. 8 shows two scanned images at different magnifications of cross-sections through a laser-drilled through-hole after processing with a jet containing a non-abrasive media in accordance with this invention.

Finally, FIG. 7 evidences the drastic effect that the non-abrasive waterjet treatment of this invention has on the appearance and surface texture of one of the through-holes in Panel 316. Not only did the non-abrasive waterjet successfully remove all debris from the bond coat and TBC deposition cycles, the entrance and interior surfaces of the hole have a shiny appearance, evidencing that the surface finish of the hole and hole entrance has been improved from that of the laser-drilled hole. The appearance of the entrance and interior surfaces of the hole is characteristic of surface microfeatures having been removed by impact fracturing or otherwise flattened by impacts with the non-abrasive media. Therefore, in addition to improving the effective area (increasing the discharge coefficient) of a cooling hole, the non-abrasive waterjet treatment of this invention visually alters the appearance and physically alters the surface of a cooling hole as compared to an identical cooling hole treated with a media-free waterjet. This beneficial effect is further evident in FIG. 8, which shows a longitudinal section of a through-hole processed in the identical manner as the hole shown in FIG. 7. Rounding of the hole entrance, which has the effect of increasing the discharge coefficient of the hole, is evident in the 25× magnification image.

An observation made throughout the above investigations was that the spherical particulate media did not fracture to any significant degree during the waterjetting operations, evidencing that the treated holes were not subjected to abrasive particles to any significant degree. An important benefit of this observation is that, in contrast to abrasive media, the particulate media of this invention can be reused by recovering the liquid (water), separating the particulate media from the liquid, and then drying the particulate media so that it can be later reused in another waterjetting operation. It is believed the non-abrasive waterjetting process would not be compromised by the reuse of the particulate media since the used media is substantially free of fractured particles, and therefore remains substantially free of undesirable particles with sharp corners and edges that would cause cutting and abrading of the cooling hole walls.

Following the above experimental investigations, the effectiveness of a non-abrasive waterjet was evaluated with a combustor liner having laser-drilled cooling holes with diameters of about 0.015 to about 0.023 inch (about 0.38 to about 0.58 mm). The liner was processed by depositing an MCrAlY bond coat having a thickness of about 0.008 inch (about 0.2 mm), followed by a YSZ TBC deposited in two steps by APS to have a final thickness of about 0.020 inch (about 0.50 mm). Deposits from each coating operation were removed from the cooling holes with a waterjet containing about 20.8 weight percent of glass spherical beads having diameters of about 45 to about 90 micrometers. The waterjet was produced at a pressure of about 10,000 psi (about 700 bar) with a nozzle having a diameter of about 0.050 inch (about 1.3 mm). Before depositing the TBC ("Pre-TBC") and after removal of the TBC deposits with the final water-jetting step ("Post-WJ"), the liner was fixtured so that five different sets of cooling holes could be individually evaluated for effective area at a pressure drop of about twenty inches of water (about 50 mbar). The measured effective areas are summarized in Table VI below.

TABLE VI

| Cooling Circuit | Pre-TBC (in$^2$) | Post-WJ (in$^2$) | Change (%) |
| --- | --- | --- | --- |
| 1 | 1.9653 | 1.9917 | +1.34 |
| 2 | 2.0227 | 2.0921 | +3.43 |
| 3 | 1.7437 | 1.7771 | +1.92 |
| 4 | 1.3120 | 1.3964 | +6.43 |
| 5 | 1.4694 | 1.5711 | +6.92 |
| Sum | 8.5131 | 8.8280 | +3.70 |

The above results clearly evidenced that a significant increase in the effective area, and therefore the discharge coefficient, occurred as a result of waterjetting the liner cooling holes with the non-abrasive particulate media of this invention. It is estimated that the discharge coefficient increased from an average of about 0.88 (Pre-TBC) to an average of about 0.91 (Post-WJ), corresponding to the 3.7% increase in effective area. In view of the 9.3 percent and 8 percent increases observed for through-holes treated with non-abrasive waterjets in previous investigations, it is believed that discharge coefficient in excess of 0.91 are possible with this invention.

While the invention has been described in terms of a preferred embodiment, it is apparent that other forms could be adopted by one skilled in the art. For example, the process of this invention could be performed on coated articles other than the combustion liner discussed, and coating materials other than those described could be removed with the non-abrasive jet of this ivention. Therefore, the scope of the invention is to be limited only by the following claims.

What is claimed is:

1. A process of removing a deposit from a through-hole of a component having a coating on a first surface thereof, the deposit being contiguous with the coating and not fully closing the through-hole, the process comprising the step of directing a liquid-containing jet at the through-hole from a second surface of the component opposite the first surface, the jet containing non-abrasive particulate media and being emitted from a nozzle at a pressure insufficient to remove substantially all of the deposit from the through-hole if the particulate media were not present in the jet, whereby removal of the deposit is primarily by the particulate media propelled by the jet and not the liquid.

2. A process according to claim 1, wherein the coating is a ceramic layer on the first surface of the component and the deposit is a portion of the ceramic layer that extends into the through-hole from the first surface of the component.

3. A process according to claim 1, wherein the component is an air-cooled component, and the through-hole is a cooling hole that intersects the first and second surfaces of the component.

4. A process according to claim 1, wherein the pressure of the jet is not higher than 1100 bar.

5. A process according to claim 1, wherein the pressure of the jet is not higher than 1000 bar.

6. A process according to claim 1, wherein the pressure of the jet is about 400 to about 1000 bar.

7. A process according to claim 1, wherein at least 70 percent of the particles of the particulate media have a spherical shape.

8. A process according to claim 7, wherein the particulate media is substantially free of particles that have fractured.

9. A process according to claim 1, wherein the particulate media is glass beads.

10. A process according to claim 1, wherein particles of the particulate media have diameters in a range of about 45 to about 90 micrometers.

11. A process according to claim 1, wherein the particulate media constitutes about 10 to about 30 weight percent of the jet.

12. A process according to claim 1, wherein the particulate media constitutes about 20 weight percent of the jet.

13. A process according to claim 1, wherein the particulate media removes the deposit from the through-hole primarily by impact fracturing the deposit and not by erosion or abrasion of the deposit.

14. A process according to claim 1, further comprising the step of depositing the coating on the first surface and the deposit in the through-hole by plasma spraying in a direction toward the first surface that is not parallel to the axis of the through-hole.

15. A process of removing deposits from cooling holes that intersect a first surface and an oppositely-disposed second surface of an air-cooled gas turbine engine component, the process comprising the steps of:

depositing a metallic bond coat on the first surface of the component and depositing a ceramic layer on the bond coat so that metallic and ceramic deposits are present in the cooling holes, the deposits being contiguous with the bond coat and ceramic layer, respectively, and not fully closing the cooling holes;

removing the deposits by directing a jet at the cooling holes from the second surface of the component, the jet being emitted from a nozzle at a pressure of less than 1100 bar and comprising a liquid containing about 10 to about 30 weight percent of a spherical non-abrasive particulate media.

16. A process according to claim 15, wherein the jet rounds edges of the cooling holes at the second surface and improves the surface finish within the cooling holes.

17. A process according to claim 15, wherein the pressure of the jet is about 400 to about 1000 bar.

18. A process according to claim 15, wherein at least 95 percent of the particles of the particulate media are glass beads having a spherical shape.

19. A process according to claim 15, wherein the particulate media is substantially free of particles that have fractured.

20. A process according to claim 15, wherein particles of the particulate media have diameters in a range of about 45 to about 90 micrometers.

21. A process according to claim 15, wherein the particulate media constitutes about 20 weight percent of the jet.

22. A process according to claim 15, wherein removal of the deposits is primarily by the particulate media propelled by the jet and not the liquid, and the particulate media removes the deposits from the cooling holes primarily by impact fracturing the deposit and not by erosion or abrasion of the deposit.

23. A process according to claim 15, wherein the ceramic layer is deposited by plasma spraying in a direction toward the first surface that is not parallel to the axes of the cooling holes, and witness holes having diameters of about 0.15 to about 0.25 millimeter are present within the cooling holes after the ceramic layer is deposited.

24. A process according to claim 15, further comprising the step recovering the liquid after the removal step, separating the particulate media from the liquid, drying the particulate media, and then reusing the particulate media in the process.

25. A process according to claim 15, wherein the component is a combustor liner.

* * * * *